Feb. 26, 1952     B. L. McKINNON     2,586,845
NEBULIZER FOR ADMINISTERING MEDICAMENTS
Filed May 15, 1950
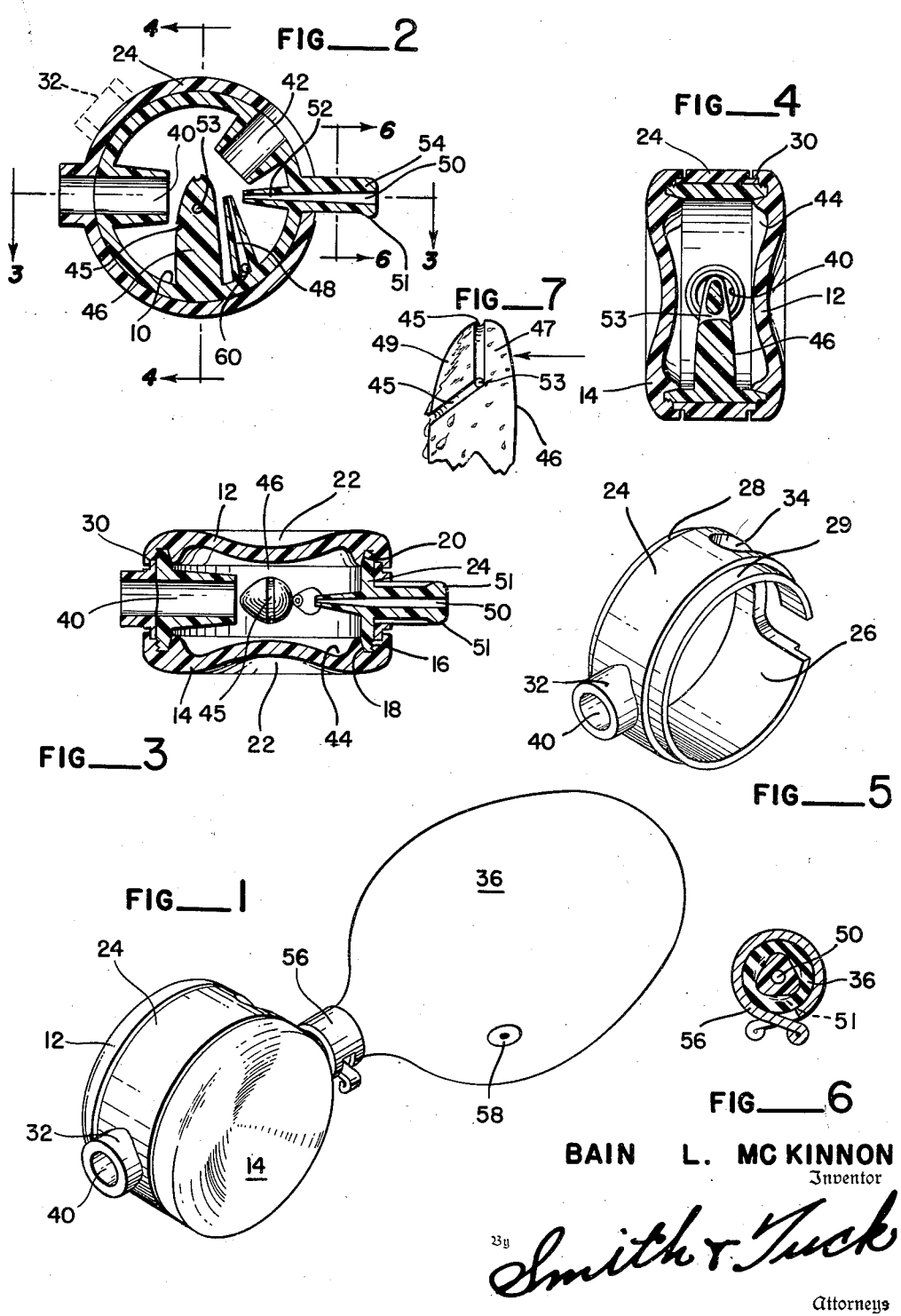
BAIN L. MC KINNON
Inventor
By Smith & Tuck
Attorneys Patented Feb. 26, 1952

2,586,845

UNITED STATES PATENT OFFICE 2,586,845

NEBULIZER FOR ADMINISTERING MEDICAMENTS

Bain L. McKinnon, Seattle, Wash.

Application May 15, 1950, Serial No. 162,065

10 Claims. (Cl. 299—88.5)

In this present invention a nebulizer is produced that is capable of creating a very fine mist or vapor with the liquids used at room temperature. To carry out this function, a fine air jet is positioned to wipe across the top of a liquid feed tube and to then direct the resulting mixture of air and liquids upon an impingement target, of unique form, so that any large particles or globules will be arrested or deflected and only the finely divided liquids discharged out through the discharge funnel. Auxiliary air is drawn through a large, air-in-take opening by the relatively high velocity of air from the air jet, thereby increasing the volume of aerosol produced. The nebulizer is designed in separable units to permit thorough cleaning of the same with the units so constructed that when assembled the same may be carried without danger of liquid leaking from the nebulizer. The device is so constructed that it is small and compact for easy carrying; and, at the same time, is so constructed as to provide a large amount of fine aerosol particles.

This nebulizer is predicated on the principle of obtaining the maximum flow of auxiliary air through the chamber in order to sweep with it and discharge the maximum amount of fine aerosol particles produced therein. This is attained by means of an efficient ejector system motivated by the air jet and by reducing the resistance to air flow through the device to the minimum consistent with efficient separation and removal of the larger droplets.

The terms "nebulizer" and "atomizer" are subject to confusion, as stated in Abramson "Principles and Practice of Aerosol Therapy," 4 Annals of Allergy 440 (Nov. 1946). In best usage, an atomizer is a device, generally composed of a simple jet system, which will reduce a bulk liquid to the form of a spray; whereas a nebulizer is a device generally composed of a simple jet system plus a suitable baffle or other separation device to remove the large particles of liquid from the spray produced.

In the past many forms of nebulizers have been produced. All observed models, and particularly those designed for the treatment of asthma with aqueous solutions of epinephrine, have one or more of the following faults: produce insufficient aerosol for convenient use; too large to be easily carried in pocket or purse; do not efficiently separate the droplets of liquid from the vapor to be discharged; and/or, because of features of design, neccessarily constructed of glass and hence subject to breakage.

2

In the treatment of bronchial asthma, as an example, it is very important that an extremely fine mist of the solution be inhaled, and that such mist must not contain droplets large enough to impinge on the surface of the mouth or throat. If this occurs, these areas, most particularly the throat, are subject to a local over-dose of the medicament, which normally contains epinephrine, and results in a very sore throat; and, in addition, the droplets, mixing with the secretions of the mouth, are swallowed and very unpleasant gastric disturbances result. Furthermore, it is important that sufficient medicament be converted to aerosol mist with each squeeze of the rubber bulb so that adequate dosage may be obtained without undue fatigue of the hand. This present nebulizer has been found to overcome the deficiencies in many of the nebulizers observed to date, and to fully meet the requirements for the treatment of such difficult diseases as asthma.

The average sufferers from asthma and kindred diseases, find it essential that they have their spray available whenever they may have an attack; and, to that end a nebulizer to properly serve this purpose must be small in size and of a shape to be carried conveniently, and be so constructed that it may be handled and carried without spilling of the liquid. It is to be noted that epinephrine solutions stain most fabrics as clothing, bed sheets and the like. It is also very desirable that the nebulizer be one which is not fragile or easily damaged, and to this end it is advisable to avoid the use of glass. Glass is a desirable material from which to make a vaporizer of this type, in that the capillary tubes forming the jet and the jet tubes can be made with very small bores. However, the fragile construction of the glass nebulizer makes the same undesirable for general use. Hospitals and clinics may use the glass nebulizer in spite of breakage because glass is particularly adaptable to rigorous sterilization. For general utility the device must be made of material not subject to damage by the shock of normal handling. Metal can be formed so as to give the very fine tubes required, however, they normally are unsatisfactory due to catalytic action, especially when adrenalin solutions are employed.

It therefore follows that the better method from the standpoint of having the device readily available to a patient, is to form the vaporizer body, the liquid supply tube, and the associated parts from suitable plastic material. By far the greatest problem, in dealing with plastic nebulizers, is caused by the properties of the common plastic materials found suitable for this purpose, such as polyethylene and polystyrene, which are not wetted by many liquids. Glass and metals are generally wetted by the same liquids. A nebulizer design that will work well if made of glass may not operate satisfactorily if constructed of plastic. An aqueous spray directed upon a glass surface is attracted to it and flows along the surface as a film. If the surface is plastic, droplets tend to form and build up on the impingement surfaces and spray directed on said surfaces will be condensed by the droplets. Therefore, it is necessary that the impingement target be so shaped that the droplets be blown to the back surface and collected to run back into the reservoir, or other means of drainage be provided, such as suitably positioned grooves or ridges. The target should also be shaped to present the minimum of interference to the passage of fine mist while at the same time serving its purpose of arresting or deflecting larger particles. If droplets collecting on the sides or back of the target are exposed to high velocity spray, particles may be blown into the discharge opening, so the target must be designed to prevent that occurrence.

The principal object of this present invention, therefore, is to produce a nebulizer which will separate all the droplets from the fine mist and discharge only a fog-like vapor at relatively high velocities and of sufficient quantity for the effective treatment of such respiratory diseases as asthma.

A further object of this invention is to provide a target in the path of the air current in said nebulizer to deflect or collect the large particles in the air jet, said target having a recessed portion providing means for the formation of a ring of collected liquid in a plane substantially perpendicular to the direction of the air jet or said target having other means providing a recess for the collection of liquids out of the direct path of the air current.

A further object of this invention is to provide a nebulizer that is characterized by its small compact construction, so that it may be easily carried by a person afflicted with a disease requiring immediate relief when an attack is encountered.

A further object of this invention is to provide a nebulizer which can be carried ready for use, but which will not spill its contents, and which does not require the unscrewing of stoppers or the removal of corks in order to have the device immediately available for use.

A further object of this invention is the construction of a nebulizer so developed that it can avoid the use of very fine bores or passageways thereby making it possible to make it of relatively unbreakable materials.

Another object of this invention is to provide a nebulizer composed of separable units to permit thorough cleaning of the same. It is also important to provide a nebulizer with no glued joints.

Further objects, advantages and capabilities will be apparent from the description and disclosure in the drawings, or may be comprehended or are inherent in the device.

In the drawings:

Figure 1 is a perspective view showing a nebulizer made after the teachings of this invention;

Figure 2 is a vertical longitudinal sectional view through the nebulizer of Figure 1 with certain parts being broken away;

Figure 3 is a horizontal section taken along the line 3—3 of Figure 2;

Figure 4 is a transverse vertical sectional view taken along the line 4—4 of Figure 2;

Figure 5 is a perspective view of the rotatable closure unit which serves to close the device and prevent leakage during the period when the device is not in use;

Figure 6 is a cross-sectional view taken along the line 6—6 of Figure 2; and

Figure 7 is an enlarged, fragmentary side view of an impingement target showing the collection of droplets on said target.

Referring more particularly to the disclosure in the drawings, the numeral 10 designates the bowl ring which forms the main frame of this nebulizer. The cylindrical ring-like member 10 is closed on each side by the side cover plates 12 and 14. Frame 10 is externally threaded to co-act with the internal threads on the cover plates. The construction is probably best illustrated at 16 in Figure 3. It has been found desirable to provide a definite sealing means and not to rely upon threads 16 for this purpose. To this end, an annular beveled groove is formed in each of the side plates at 18, and a corresponding internal beveled surface is formed on ring 10 as at 20. It now will be clearly understood, it is believed, that as the side plates are screwed home, they form a very secure liquid-tight joint through the co-action of the beveled groove and the beveled portion of ring 10. It has been found desirable to dish the side plates inwardly, as is illustrated at 22, as for convenience of gripping the nebulizer, for guiding liquid in the nebulizer to the edges of the side plate, and for restricting the air passage in the center of the nebulizer.

In order to provide a convenient means of sealing the discharge opening and the air intake opening when the device is inoperative, a sealing ring 24 is provided. This is especially illustrated in Figure 5, and consists of a cylindrical portion having the interior bore 26 adapted to form a snug rotatably slip fit on the ring-like body 10. On each side ring 24 is provided a recessed portion as at 28 and 29. These portions are adapted to fit in an undercut groove formed in the two side closure plates 12 and 14. This is illustrated at 30 in Figures 3 and 4.

Outstanding from the outer surface of ring 24 is the outer discharge nozzle portion 32. When the nebulizer is in use this forms a continuation of the inner discharge nozzle portion 32, and also forms a convenient means for turning ring 24 to either the using or carrying position. Substantially diametrically opposite nozzle portion 32 is an opening 34, which is adapted to include the air jet tube, which must extend outwardly sufficiently to engage bulb 36.

It will be noted that the various parts, e. g., bowl ring, cover plates, side cover plates, and sealing ring, are separable affording convenient means for thoroughly cleaning the parts, as distinguished from many vaporizers which are most difficult to clean, the various parts being glued together or formed as a unit.

The cylindrical frame member 10 has formed within it a number of coacting elements. These are, the inner discharge nozzle 40, and the air intake tube 42. Both of these members extend well into the cavity formed within frame 10 and they are radially disposed and preferably disposed at substantially the angular relationship indicated in Figure 2. Two purposes are served by this construction; the first and most apparent is that a considerable amount of liquid may be contained within the body of the nebulizer and still it will not leak out of either of these openings, due to the fact that they extend inwardly from the periphery of the chamber; and, if the device is to be laid on its side, they are disposed above the level of the liquid which would normally collect in the annular portions 44 of these side members. The second, and very important function of these inwardly extending tubes is, on one hand, to deliver the necessary air close into the jet which picks up and carries with it this additional air; and the discharge opening 40, by extending well into the chamber, picks up that portion of the spray that is finely atomized and any other particles of considerable mass normally will be deflected away from this opening by the impingement of target 46. Those globules which are not caught by this target, normally will have sufficient mass to be carried out to the rim of ring 10, where they will be collected and eventually run down to the lower portion of the same where they again can be picked up by the liquid supply tube 48. Diametrically opposite from and in axial alignment therewith is the discharge nozzle 40 and the air jet 50.

Air jet 50 is formed as a true jet having the tapering bore 52 so as to give the maximum velocity to the air projected therethrough. The nozzle end extends well into the mixing chamber of the atomizer, and said end is in close proximity to and its axis is substantially aligned with the top of the liquid supply tube 48. The outwardly extending portion of jet 50 is disposed within opening 34 of the sealing ring 24, and is formed so as to provide an adequate seat for the engagement of bulb 36. Referring to Figure 6, it is to be noted that a preferred form of extension 54 is to have it flat sided, or otherwise configured so as to permit the clamping of bulb 36 thereto as by means of the spring clip 56, it being desirable to prevent the turning of bulb 36 on the jet extension 54. An annular outward end 51 is formed as a further securing means for bulb 36. Bulb 36 is provided with an air intake at 58. This intake is positioned for ease of operation with this device, and the position illustrated in Figure 1 has been found to be very satisfactory, this being the only air opening, there being none in the rear of the bulb as is common with a bulb of this order. By placing the air intake 58, as illustrated generally, the manipulation of the vaporizer can be easily achieved with one hand, and the finger that normally closes the air intake will always conveniently find the same at the same point, with reference to the bowl or atomizing chamber. This is desirable, in that for proper functioning, the nebulizer should be so held that the liquid tube will always be able to pick up a supply of liquid. Bulb 36 extends directly back from jet 50, which is convenient for carrying the same, the whole nebulizer having a generally oblong outline.

Liquid supply tube 48 is secured on the inner surface of frame 10 and is provided with openings near its base as 60, so that a supply of liquid will always be available for the tube. In the usual nebulizer the liquid rises in the tube by capillary attraction, however, in this instance the liquids normally used will not wet the tube and no such action is available. These conditions require a syphon action, and to facilitate the same tube 48 should form an acute angle with jet 50, substantially as is illustrated in Figure 2.

Disposed between the supply tube and the discharge nozzle 40 is the target of impingement. This is preferably formed as a pillar, secured on the inner surface of frame 10, or as part thereof. The target 46 is spaced a relatively substantial distance from air jet 50 and liquid supply tube 48 in comparison with many of the prior devices. When the three elements are closely spaced together, target 46 becomes more of a device to break up the particles of vapor; while in the spaced relationship depicted, the target becomes more of a separator, either collecting or deflecting large droplets in the vapor rather than breaking up the droplets. The present spacing is believed desirable for minimum interference with the air jet and maximum production of aerosol, as well as efficient separation of drops. Various forms of targets for the impingement of the jet have been employed in certain nebulizers, particularly those made of glass. However, it has been proved that if the upper portion of the pillar, which actually forms the target, has a vertical cross-section conforming to the shape of a parabola it can be depended upon to function best. In horizontal cross-section the shape is preferably substantially ovate or teardrop with the small portion toward nozzle 40 because of the streamlined outline presented. A circular horizontal cross-section with the parabolic vertical sides is a fairly efficient target and may be produced for some uses because of the relative cheapness of manufacture. It has been found that the combined generally parabolic and ovate cross-sections prevent droplets from forming on the face of the target toward jet 50, the air forcing the large particles down and to the other side. At the same time this shape is streamlined to least hinder the flow of finely divided vapor and a very substantial flow of such vapor is obtained. This target may be said to have two main functions, one is to collect large globules of liquid that have not been broken down fine enough for treatment purposes. The collected globules, being under the influence of the air jet, tend to pass around the pillar and to flow down its rear sloping sides until it again merges with the main supply of liquid. It has been found that the pillar 46 should have an increasing cross-section from top to bottom as this form causes the globules to merge with each other and form a film on the lee side of the pillar and effectively prevents the formation of large droplets which might be blown off the target and out nozzle 40. The second use of this target is to prevent the free passage of nebulized vapor from the jet formed by the air jet 50 and the liquid supply tube 48 out the discharge opening; and to, rather, cause the large particles or globules, not collected by the target, to be deflected and be collected on the interior walls of the nebulizer chamber where they will drain back to the main body of liquid.

In Figure 7 is shown an enlarged side view of a pillar 46 made of plastic material. The droplets of liquid tend to stand out from the surface of the plastic more than if the pillar were made of glass. If the droplets of liquid are not moved from the surface upon which the air and vapor impinges, as from the direction of the arrow, the droplets will become larger and much vapor will be condensed on contact with the collected liquid. However, with the target formed with an ovate horizontal cross-section and with the sides having parabolic outline, it has been found that the air impinging on the surface facing the arrow tends to move the droplets back and down. This outline also presents the minimum of interference with the flow of air incident to effective collection and deflection of the large particles of vapor.

Referring to Figure 7, there is shown a groove 45 running from the top downward in a vertical path and then sloping away from the air jet in the rear. This is a valuable feature of the impingement target in providing a recess for the accumulation of liquid out of line of high velocity vapor and in providing a guide for the flow of liquid toward the base of the target. At the same time, groove 45 does not seriously impair the streamlining of the impingement target 46. The horizontal cross-section could be varied slightly from that depicted without impairing greatly the streamlined outline or the ability of the target to deflect and collect large particles of spray and block the passage of the large particles into the discharge passageway. The most important features are to have a larger portion facing the air jet with a greater width transversely of the direction of the air jet, as at 47, and a portion behind the larger portion, as at 49, with a lesser width; and to have a streamlined target. Behind the larger portion 47 is a narrower portion in which the droplets may collect and run down out of the direct line of the air blast. An opening 53 runs through target 46 connecting portions of said groove on opposite sides of the target. Such an opening is a desirable feature as it provides means for forming a recess portion for the collection of liquid in the shape of a ring lying in a plane substantially perpendicular to a line between the air jet opening and the discharge opening. Because of the cohesive powers (surface tension) of usual aerosol liquids, when a ring of liquid is formed in the recessed portions, the collected liquid is held by the cohesive ring from any tendency to be blown off by the air jet. A drop form is broken as it passes over the ring of liquid and drains down the groove. If the drop is large it may be partially retained by the ring with the remainder stretched out upon the surface beyond the recess as an elongated film and gradually moved down the lee side.

Attention is invited to the fact that this nebulizer without the target pillar 46 forms a very effective atomizer for use where droplets are not objectionable. It has further been found by trial that certain other forms of atomizers may be converted to a nebulizer by the addition of the pillar target, if the same is positioned substantially as illustrated herein, and that its efficiency as a separator is not dependent upon an auxiliary air system being employed.

It is believed that it will be clearly apparent from the above description and the disclosure in the drawings that the invention comprehends a novel construction of a nebulizer for administering medicaments.

Having thus disclosed the invention, I claim:

1. A nebulizer, comprising: a cylindrical member; cover plates on either side of said member, each cover plate having a circular groove in which the edges of said cylindrical member are positioned, one side-wall of said groove being threaded and one side-wall being beveled and adjoining surfaces of said cylindrical member being likewise threaded and beveled; said cylindrical member having a discharge opening, an air jet opening, and an air inlet opening, said discharge opening and said air jet opening being oppositely positioned on either side and said air inlet opening being above said air jet opening and at acute angles to the same; an impingement target extending from the bottom of said cylindrical member to past the center of the same, the sides of said impingement target being generally parabolic in vertical cross-section; an interior nozzle around each of said openings and an outward extension around said air jet opening; a flexible bulb having an opening in which said outward extension is positioned; and a liquid supply tube extending from the bottom of said cylindrical member, between said impingement target and said air jet opening, to adjacent the line between the center of said air jet opening and said discharge opening, there being an opening at the base of said supply tube.

2. A nebulizer, comprising: a substantially cylindrical body, the annular portion of the body having a discharge opening, an air jet opening, and an air inlet opening, said discharge opening and said air jet opening being oppositely positioned on either side and said air inlet opening being above said air jet opening and at acute angles to the same; an impingement target extending from the bottom of said annular portion to past the center of the same, said impingement target having a generally ovate outline in horizontal cross-section with the small portion toward said discharge opening and the sides of said target being generally parabolic in vertical cross-section and there being a groove in said target running from either side over the upper portion of the target in the surface of the target toward the discharge opening and there being an opening running through said target connecting portions of said groove on opposite sides of the target; an interior nozzle around each of said openings and an outward extension around said air jet opening; a flexible bulb having an opening in which said outward extension is positioned; and a liquid supply tube extending from the bottom of said annular portion, between said impingement target and said air jet opening, to adjacent the line between the center of said air jet opening and said discharge opening, there being an opening at the base of said supply tube.

3. The subject matter of claim 2 in which there is a sealing ring slidably positioned outside of the annular portion of said cylindrical body, having openings corresponding in one position to said discharge opening, air jet opening and air inlet opening, said opening corresponding to said air jet opening and in which said outward extension around said air jet is positioned being elongated so that said sealing ring may be slid to a second position in which said discharge opening and said air inlet opening are sealed, and said sealing ring having an outer discharge nozzle portion around the opening corresponding to said discharge opening.

4. The subject matter of claim 2 in which the outward extension around said air jet opening has a plurality of flat sides except at its outward end which is annular; in which said interior nozzle around said air jet opening has a tapered bore with its reduced portion inward; and in which there is a side air intake opening in said bulb, permitting control of air intake by the hand of the user of the nebulizer.

5. A device for producing aerosol, comprising: a cylindrical member; cover plates on either side of said member, each cover plate having a circular groove in which the edges of said cylindrical member are positioned, one side-wall of said groove being threaded and one side-wall beveled and adjoining surfaces of said cylindrical member being likewise threaded and beveled; said cylindrical member having a discharge opening, an air jet opening, and an air inlet opening; an interior nozzle around each of said openings and an outward extension around said air jet opening; a flexible bulb having an opening in which said outward extension is positioned; a liquid supply tube positioned in said cylindrical member between said discharge opening and said air jet opening, there being an opening in the base of said liquid supply tube, and the top of said supply tube being positioned close to the interior nozzle around said air jet opening; and a sealing ring slidably positioned outside of said cylindrical member having openings corresponding in one position to said discharge opening, air jet opening and air inlet opening, said opening corresponding to said air jet opening and in which said outward extension around said air jet is positioned being elongated so that said sealing ring may be slid to a second position in which said discharge opening and said air inlet opening are sealed.

6. The subject matter of claim 5 in which an impingement target is positioned in said cylindrical member between said liquid supply tube and said discharge opening.

7. The subject matter of claim 6 in which said sealing ring has an outer discharge nozzle portion around the opening corresponding to said discharge opening and in which the outer edges of said sealing ring are recessed and there is a second circular groove in said cover plate in which the edges of said sealing ring are positioned.

8. In a nebulizer having an air jet opening, an air inlet opening, a discharge opening, an impingement target between said air jet opening and said discharge opening and a liquid supply tube between said impingement target and said air jet opening, the improvement, comprising: an interior nozzle around each of the openings; said air jet opening and said discharge opening being positioned on opposite sides; said impingement target being spaced from said liquid supply tube; and said impingement target having in horizontal cross-section an outline elongated in relation to the line between the air jet opening and discharge opening, said outline having a first portion toward said air jet opening and a second portion toward said discharge opening, said portions being of increasingly smaller transverse width as they separate and the widest portion of the first portion being greater than the widest portion of the second portion providing a recess in the lee of the larger portion in which liquid on said target may collect.

9. In a nebulizer having an air jet opening, a discharge opening, an air intake opening, an impingement target between said air jet opening and said discharge opening and a liquid supply tube between said impingement target and said air jet opening, the improvement, comprising; said impingement target being spaced from said liquid supply tube; the end portion of said impingement target on which air from said air jet opening impinges having a parabolic outline in cross-section longitudinally of said target and having an annular outline in transverse cross-section; and an interior nozzle around each of the openings.

10. In a nebulizer having an air jet opening, a discharge opening, an air intake opening, an impingement target between said air jet opening and said discharge opening, and a liquid supply tube between said impingement target and said air jet opening, the improvement, comprising: said impingement target being spaced from said liquid supply tube and said impingement target being so formed to provide a recessed portion for the collection of liquid, said recessed portion forming an annular groove lying in a plane substantially perpendicular to a line between said air jet opening and said discharge opening.

BAIN L. McKINNON.

REFERENCES CITED

The following references are of record in the file of this patent:

UNITED STATES PATENTS

| Number | Name | Date |
|---|---|---|
| 2,274,669 | Curry | Mar. 3, 1942 |

FOREIGN PATENTS

| Number | Country | Date |
|---|---|---|
| 547,480 | France | Sept. 23, 1922 |